United States Patent

[11] 3,523,549

[72] Inventor Noel M. Anderson
 P.O. Box 392, Storm Lake, Iowa 50588
[21] Appl. No. 703,973
[22] Filed Feb. 8, 1968
[45] Patented Aug. 11, 1970

[54] YARD HYDRANT VALVE
 4 Claims, 5 Drawing Figs.
[52] U.S. Cl. .................................................. 137/288,
 137/307, 251/95, 251/279, 251/353
[51] Int. Cl. .................................................. E03b 9/14
[50] Field of Search .................................................. 137/286-
 288, 301-307; 251/O-ring, 279, 325, 347, 353,
 354; 74/Considered

[56] References Cited
 UNITED STATES PATENTS
 295,600  3/1884  Vanduzen .................. 137/288

1,074,174  9/1913  Holzapfel .................. 137/287
2,621,746  12/1952  Beauregard .................. 251/354X
 330,776  11/1885  Dowling et al .................. 137/288

Primary Examiner— William F. O'Dea
Assistant Examiner— Richard Gerard
Attorney— Morton S. Adler ABSTRACT: A yard hydrant valve utilizing a hollow fluid flow pipe with a capped bottom and only two O-rings bracketing lateral inlets above the bottom of said pipe. The valve includes a drain hole above the inlets and with only one of the O-rings being effective at any one time as a seal means relative to the control of inlet flow and the effective use of the drain hole. The valve has a controllable handle for regulating the volume of inlet flow. This valve is especially designed for the use of plastic components in producing a highly efficient and extremely economical hydrant valve.

Patented Aug. 11, 1970
3,523,549
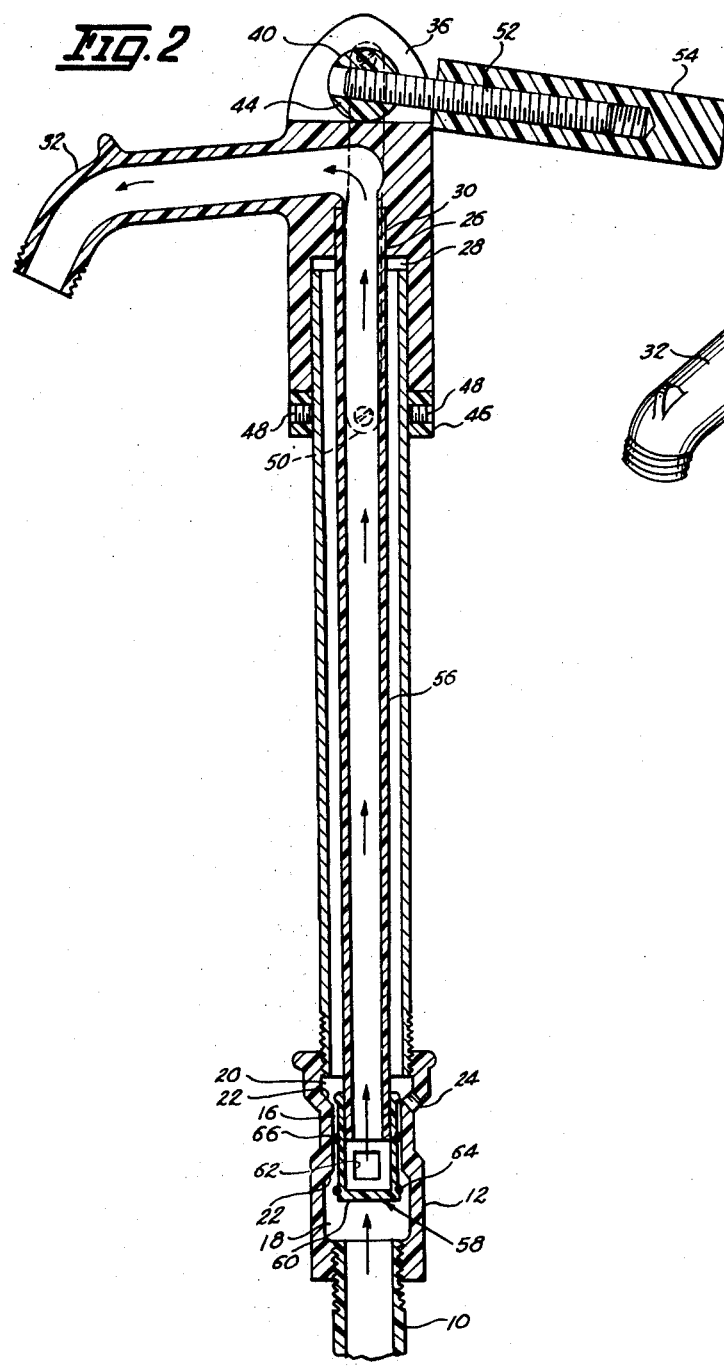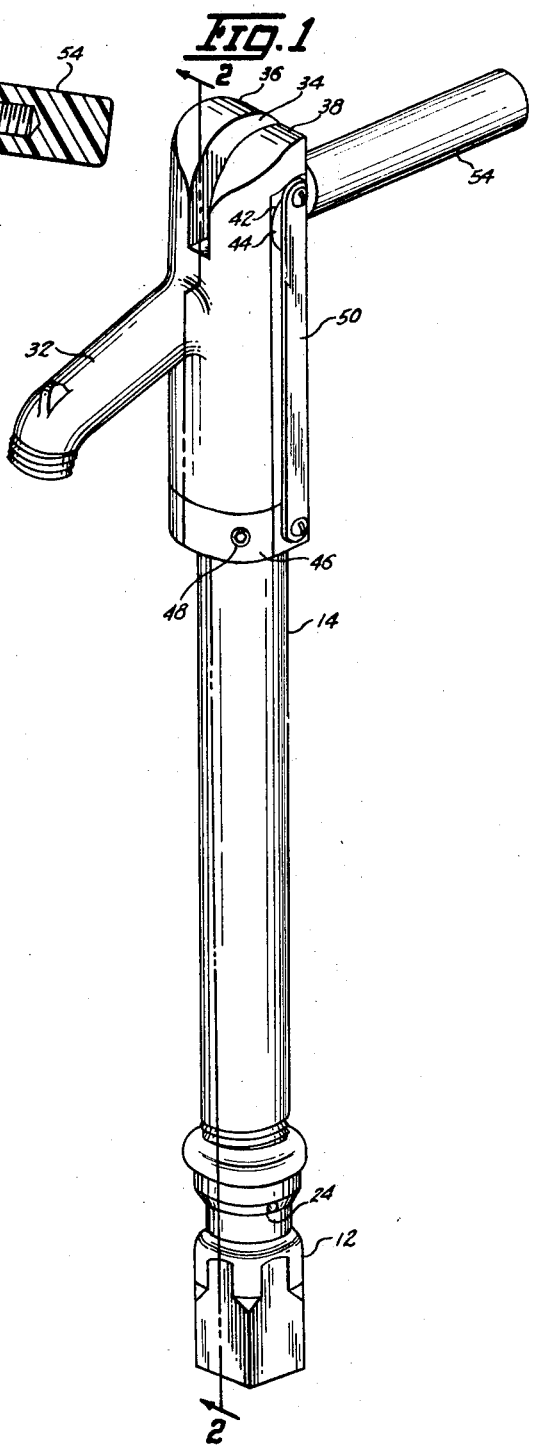
INVENTOR.
NOEL M. ANDERSON
BY Morton S. Adler
ATTORNEY.

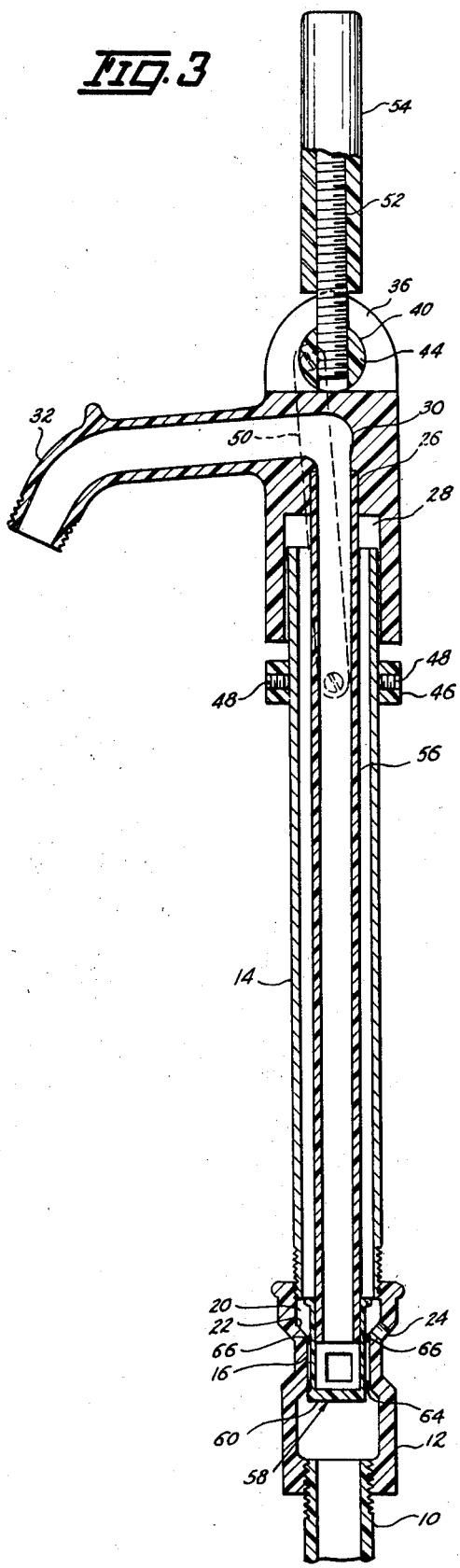

3,523,549

1

YARD HYDRANT VALVE

BACKGROUND OF THE INVENTION

1. Field of the Invention

This invention relates to hydrant valves and more particularly to an improved but highly efficient valve for controlling the inlet flow and the operation of a drain hole without permitting any of the inlet fluid to become intermixed with fluid to be drained out of the hydrant.

This invention is also concerned with the provision of a simple but effective control means for regulating the volume of inlet flow and is especially adapted for the use of plastic materials in the production of a highly efficient but economical article.

2. Description of the prior art

Hydrants have long been used in connection with water systems and much of the basic hydrant art lies primarily in the time period of the late 1800's and early 1900's for which illustrative patents are indicated at Reissue No. 49; 188,384; 935,373 and 519,660. More recent illustrations of the hydrant art are shown in my own patents 2,649,111 and 2,649,768. One of the common characteristics of the hydrant structure is the use of a separate valve means relative to the inflowing water together with separate sealing means such as cup washers and the like in providing some arrangements for permitting water to drain out of the drain hole when this is required. While many of the prior art hydrants are quite effective for their intended purpose, they are for the most part relatively complicated and expensive to manufacture and one of the primary objects of the present invention is to produce a hydrant having a novel valve arrangement but with adequate efficiency in operation and simplified in structure so as to lend itself to extremely economical fabrications in the production of an article for the competitive market.

SUMMARY

The present invention utilizes a hydrant flow pipe vertically movable within a standpipe. The lower end of the flow pipe is capped or closed and is provided above the cap with lateral inlet ports communicating with the interior of said pipe. This lower unit is movable through a restricted passageway in a fitting that connects the standpipe to the main water supply pipe. The inlet opening in the flow pipe is bracketed above and below with O-rings of which only one is in sealing engagement within the restricted passageway of the fitting at any one time except for a momentary period when the valving mechanism is moving from closed to open position or vice versa.

The flow pipe is vertically movable by a handle arrangement which can be locked at any desired place and except for the hydrant standpipe which is of metal and the O-rings, all the other components of this hydrant are preferably made of plastic.

This invention provides a very simplified but efficient valve means where the valving action is accomplished by the plastic wall of a restricted passageway.

BRIEF DESCRIPTION OF THE DRAWINGS

FIG. 1 is a perspective view showing this new yard hydrant valve,

FIG. 2 is a longitudinal section view taken on the line 2-2 of FIG. 1 and showing the valve in open position relative to the source of supply from the water supply pipe, FIG. 3 is similar to FIG. 2 but shows the valve in an intermediate position between full closed and full open position relative to the water supply pipe, FIG. 4 is similar to FIGS. 2 and 3 but shows the valve in closed position relative to the water supply pipe and in position to permit drainage from the standpipe out of the drain hole, and FIG. 5 is a fragmentary perspective exploded view of the lower end of the hydrant flow pipe to more clearly illustrate the closed end and side inlet ports.

2

DESCRIPTION OF THE PREFERRED EMBODIMENT

Referring to the drawings, I have used the numeral 10 to designate a standard main water supply pipe through which water is pumped under pressure. A hollow fitting 12, which also serves as a valve housing, is threadably attached to the supply pipe 10 at one end and at the other end is similarly attached to one end of a standpipe 14 so as to afford a fluid flow communication between said pipes. Intermediate the joined ends of the respective pipes 10 and 14 within fitting 12, such fitting is provided with a reduced passageway designated by the numeral 16. Such passageway 16 defines the enlarged chamber 18 in direct communication with supply pipe 10 and the enlarged chamber 20 in direct communication with the standpipe 14. At each end of the restricted area 16, the inner walls of fitting 12 are angled or bevelled toward the respective chambers 18 and 20 as indicated by the numeral 22. A drain hole 24 is provided in fitting 12 and in communication with the upper chamber 20.

Associated with the upper end of the standpipe 14 is the elongated head chamber 26 having an enlarged well or bore portion 28 and a reduced bore portion 30 in communication with portion 28 and which continues through the integral nozzle 32. Well portion 28 is designed to embrace the upper portion of the standpipe 14 so that member 26 is vertically slidable relative thereto as will appear.

The upper end of the head chamber 26 is provided with a transverse slot 34 as best seen in FIG. 1 so as to provide the ears 36 and 38 in which are the respective registering holes 40 and 42 for rotatably receiving the stub shaft 44 that is flush with opposed sides of the head chamber 26.

A collar 46 is secured as by set screws 48 to the upper portion of the standpipe 14 and below the bottom of head chamber 26. On opposed sides of such head chamber relative to the ends of shaft 44, a rigid link 50 is pivotally secured at one end to collar 46 and similarly secured and eccentrically arranged relative to respective ends of shaft 44. An operating rod 52 is attached as by threading to shaft 44 for which such shaft is suitably tapped intermediate ears 36 and 38 and a handle member 54 is threadably attached to the other end of rod 52. Thus far described, rod 52 is movable by handle 54 relative to notch 34 as shown in the drawings whereby, because of the eccentric attachment of rigid links 50 to shaft 44, the head chamber 26 can be raised and lowered relative to its position on the standpipe 14. In this regard, it will be noted that the upper surface of ears 36 and 38 are arcuate and handle 54 can be threadably adjusted on rod 52 to engage such arcuate surface tightly at any selected point whereby the position of the head chamber 26 at such point will be maintained.

A hydrant flow pipe 56 as best seen in FIG. 2 and 4, is secured to the inside of the head chamber 26 so as to be in communication with passageway 30. Pipe 56 is of smaller diameter than the standpipe 14 and since pipe 56, as well as the head chamber 26, is preferably made of a plastic material, such pipe can be secured within the head chamber by any suitable bonding agent for plastics. If metal parts are used, a threadable engagement can be used. Pipe 56 is adapted to extend downwardly into the standpipe 14 and at its bottom end terminates in a plug or cap 58, which is preferably made of plastic material and is illustrated more particularly in FIG. 5. Plug 58 is hollow and closed at its bottom end 60. Spaced slightly upwardly from closed end 60, such plug is provided with opposed lateral inlet openings or ports 62 affording the means of flow communication from the outside of plug 58 to the interior of the hydrant pipe 56. Plug or cap 58 carries an external O-ring 64 seated in a suitable surface groove below the opening 62 and a second O-ring 66 similarly arranged above the opening 62.

Plug 58 as seen in the drawings is designed to be movable relative to the reduced passageway 16 in fitting 12 and for this purpose, the diameter of plug 58 is such that each of the O-rings 64 and 66 will be in fluid tight engagement with passageway portion 16 whenever the position of plug 58 as hereafter described is such that one of said O-rings is within the limits of said reduced passageway. Preferably, plug or cap 58 is made as a separate piece and suitably bonded to the lower end of pipe 56 but it will be understood that pipe 56 may be formed with an integral lower end having the structure of plug 58.

OPERATION

With this hydrant valve constructed and arranged as described, the closed or "off" position is shown in FIG. 4 where handle 54 is in a horizontal position extending from head chamber 26 in the same direction as nozzle 32. By moving handle 54 through slot 34 to its horizontal position as seen in FIG. 2 where it extends from head chamber 26 in a direction opposite to nozzle 32, chamber 26, pipe 56 and cap 58 are moved to their lowermost open or "on" position.

In the "on" position as seen in FIG. 2, the upper O-ring 66 is in sealing engagement with the restricted passageway 16 and is the only seal means utilized at this point in the operation of this hydrant structure. The lower closed end 60 of the cap or plug 58 is disposed within the lower chamber 18 so that water under pressure from the supply line 10 can flow around the bottom of cap 58, through the inlet openings 62, up to hydrant pipe 56 and out of the nozzle 32. If it is desired to control the volume of flow from its full force, handle 54 can be elevated slightly to bring the lower O-ring 64 closer to the bevelled edges 22 inside of the fitting 12 and this will create a restricted passageway for the water into the opening 62 and correspondingly reduce the volume of flow. The position of the cap 58 at this point can be maintained by screwing the handle 54 into frictional contact with the arcuate edge of the ears 36 and 38 as previously described.

In moving the described mechanism from "on" (FIG. 2) to "off" (FIG. 4) position, the cap 58 will pass through an intermediate position as shown in FIG. 3 where handle 54 is vertical and where both of the O-rings 64 and 66 are temporarily engaged with the reduced passageway 16 of fitting 12. This temporary sealing contact of both rings in passageway 16 affords a momentary instant where flow from pipe 10 is completely cut off from inlets 62 and likewise any drainage from the pipe 56 out of the drain hole 24 is withheld momentary until the lower O-ring 64 is fully seated against the walls in passageway 16 as seen in FIG. 4. In the position shown in FIG. 4, it is pointed out that only the lower O-ring 64 is utilized as a valving seal since the upper O-ring 66 is now disposed within the upper chamber 20. In this position, water from the hydrant pipe 56 will drain by gravity out of said pipe through chamber 20 and out of the drain hole 24.

It will be appreciated from the foregoing that the structure described is exceedingly efficient, though very simple in operation and function. Except for the O-rings 64 and 66, all parts of this hydrant may be fabricated from plastic materials which materially reduces the costs of production and this includes parts from standard material such as standpipe 14 and rod handle 52 which have been shown as metal for purposes of illustration. The interaction between the rubber O-rings and the plastic walls of the reduced chamber 16 provides a most effective fluid seal means which, because of the continual exposure to water, has proved in tests that the wear of the O-rings is practically unmeasureable. It can be appreciated also that the present invention eliminates the necessity for valves and valve seats in their traditional construction and that by alternately utilizing one or the other of the O-rings 64 and 66 as described, together with the construction of the cap of plug 58 having the sealed bottom and side inlets, this hydrant valve is aptly suited to perform its intended function.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. A hydrant valve, comprising:
    a hollow valve housing adapted to be connected at one end to a source of fluid under pressure,
    said housing being provided with a restricted axial passageway intermediate and spaced inwardly from the respective ends of said housing,
    a hydrant flow pipe having a closed end and an open end and provided with a side inlet port spaced inwardly from but closely adjacent said closed end,
    a pair of spaced O-rings mounted exteriorly of said hydrant flow pipe so as to be disposed respectively at opposite sides of said inlet port,
    said hydrant flow pipe being disposed so that its closed end extends into the other end of said valve housing
    a standpipe secured at one end to said other end of said valve housing,
    a head chamber with an integral nozzle,
    said head chamber secured to said open end of said hydrant flow pipe and in flow communication therewith,
    said head chamber being slidably mounted to the other end of said standpipe,
    one end of said head chamber being provided with a transverse slot defining a pair of spaced ears,
    a shaft disposed transversely of said slot and rotatably carried by said ears,
    a handle secured to and radially extending from said shaft,
    a collar fixedly attached to said standpipe intermediate said head chamber and said valve housing,
    a rigid link pivotally connected at one end to said collar and similarly secured and eccentrically arranged at the other end to one end of said shaft, and
    movement of said handle in respective opposite directions causing said shaft to rotate on its longitudinal axis whereby said head chamber can be selectively moved relative to said standpipe with a corresponding movement of said hydrant flow pipe relative to said valve housing whereby in one direction of movement, only one O-ring is in fluid seal engagement in said restricted passageway and said inlet port is exposed to a fluid flow which can pass through said hydrant flow pipe and in the opposite direction or movement, only the other O-ring is in fluid seal engagement with said restricted passageway and said inlet port is closed to communication with the fluid supply.
2. A device as defined in claim 1 including:
    said ears having planar arcuate edges, and
    said handle being adjustably mounted on said shaft whereby it can be frictionally engaged at selected points with said arcuate edges to hold said handle immovable at said points.
3. A hydrant valve structure, comprising:
    a hollow valve housing adapted to be connected at one end to a source of fluid under pressure,
    a hydrant flow pipe having a closed end and an open end and provided with a side inlet port spaced inwardly from but closely adjacent said closed end,
    said hydrant flow pipe being disposed so that its closed end extends into the other end of said valve housing,
    valve means on said hydrant flow pipe operable relative to said housing to selectively open and close said inlet port to fluid flow communication,
    a standpipe secured at one end to said other end of said valve housing,
    a head chamber with an integral nozzle, said head chamber secured to said open end of said hydrant flow pipe and in flow communication therewith,
    said head chamber being slidably mounted to the other end of said standpipe,
    one end of said head chamber being provided with a transverse slot defining a pair of spaced ears,
    a shaft disposed transversely of said slot and rotatably carried by said ears, a handle secured to and radially extending from said shaft, a collar fixedly attached to said standpipe intermediate said head chamber and said valve housing, a rigid link pivotally connected at one end to said collar and similarly secured and eccentrically arranged at the other end to one end of said shaft, and movement of said handle in respective opposite directions causing said shaft to rotate on its longitudinal axis whereby said head chamber can be selectively moved relative to said standpipe with a corresponding movement of said hydrant flow pipe relative to said valve housing.

4. A device as defined in Claim 3 including:
   said ears having planar arcuate edges, and
   said handle being adjustably mounted on said shaft whereby it can be frictionally engaged at selected points with said arcuate edges to hold said handle immovable at said points.